United States Patent
Hoffman et al.

(10) Patent No.: US 9,836,295 B1
(45) Date of Patent: Dec. 5, 2017

(54) METHOD AND SYSTEM FOR SECURE AUTOMATED DEPLOYMENT OF EMULATED COMPUTER SYSTEM

(71) Applicants: Philip M Hoffman, Malvern, PA (US); Sharon M Mauer, Malvern, PA (US); Michael I Bell, Malvern, PA (US); Greg L Gensichen, Malvern, PA (US); Dwayne E Ebersole, Malvern, PA (US); Tatyana Martsun, Malvern, PA (US)

(72) Inventors: Philip M Hoffman, Malvern, PA (US); Sharon M Mauer, Malvern, PA (US); Michael I Bell, Malvern, PA (US); Greg L Gensichen, Malvern, PA (US); Dwayne E Ebersole, Malvern, PA (US); Tatyana Martsun, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/931,890

(22) Filed: Nov. 4, 2015

(51) Int. Cl.
*G06F 9/44* (2006.01)
*G06F 9/45* (2006.01)
(Continued)

(52) U.S. Cl.
CPC ............ *G06F 8/61* (2013.01); *G06F 21/121* (2013.01); *G06F 11/261* (2013.01); *G06F 2221/0704* (2013.01)

(58) Field of Classification Search
CPC ...... G06F 8/61; G06F 9/45504; G06F 11/261; G06F 21/121; G06F 2221/0704
(Continued)

(56) References Cited

U.S. PATENT DOCUMENTS

| 7,058,932 B1 * | 6/2006 | Jennings | G06F 9/45504 717/138 |
| 2005/0066086 A1 * | 3/2005 | Ramanathan | G06F 9/45537 710/63 |

(Continued)

OTHER PUBLICATIONS

"ClearPath MCP Software Product Catalog," Apr. 2013, Unisys Corp.*

*Primary Examiner* — Qing Chen
(74) *Attorney, Agent, or Firm* — Robert P. Marley (57) ABSTRACT

A method and system for secure automated deployment of an emulated computer system. The method includes providing a download package for installation on a target machine. The download package includes a generic emulated computer system having no unique identity, no model identity, no features, and minimal processing components. The download package also includes a customer order file based on an order from a customer of the target machine. The customer order file includes a machine identity, at least one machine capability, and control data. The download package also includes at least one enabling key configured to enable the emulated computer system on the target machine. The enabling key is customized based on the order from the customer of the target machine, and includes identity information that restricts the use of the emulated computer system on any computer system other than the target machine. The method also includes delivering the download package to the target machine for installation of the emulated computer system on the target machine. The download package prevents the unauthorized cloning of the emulated computer system onto any hardware platforms other than the target machine, and prevents the unauthorized use of any hardware other than the hardware of the target machine.

21 Claims, 10 Drawing Sheets

(51) Int. Cl.
*G06F 9/445* (2006.01)
*G06F 9/455* (2006.01)
*G06F 21/12* (2013.01)
*G06F 11/26* (2006.01)

(58) Field of Classification Search
USPC .............. 717/134, 138, 174–178; 703/23–28
See application file for complete search history.

(56) References Cited

U.S. PATENT DOCUMENTS

| | | | |
|---|---|---|---|
| 2006/0047974 A1* | 3/2006 | Alpern ................ | G06F 9/44521 713/191 |
| 2008/0133214 A1* | 6/2008 | Leventhal ........... | G06F 9/45537 703/26 |
| 2009/0144725 A1* | 6/2009 | Vrhel, Jr. ................. | G06F 8/60 717/174 |

\* cited by examiner

METHOD AND SYSTEM FOR SECURE AUTOMATED DEPLOYMENT OF EMULATED COMPUTER SYSTEM

BACKGROUND

Field

The instant disclosure relates to emulated computer systems, and in particular to securely deploying emulated computer systems.

Description of the Related Art

There are many challenges involved in deploying a customer downloadable emulated computer system with a full complement of customized features and capabilities. The delivery of such a system should be accomplished with a minimum of customer interactions that are required to enable and configure system features. The customer should be able to seamlessly download an installation package, install the emulated computer system, and start the machine in such a way that all customized features and capabilities are available from the start. Also, the system delivery should be accomplished in a secure manner that protects the vendor's proprietary information. That is, the customer should be able to run the emulated computer system with full entitlement on the target machine, but the customer must be prevented from changing characteristics of the target machine or cloning additional instances without proper authorization from the vendor.

Conventionally, to deliver a customer-specific emulated computer system, the vendor constructs a target machine in-house according to the machine model and feature styles defined by an order from the customer. The customer's desired features and capabilities typically are fully defined by the ordered styles, and are installed by the vendor or the vendor's manufacturer. The customer's desired features and capabilities typically include the installation of additional hardware and software features associated with specific styles.

Each of the features desired by the customer typically are activated or enabled using one of several conventional methods. For example, according to one conventional method, the features are enabled and limited by the existence of the hardware installed on the target machine by the vendor's manufacturer. Alternatively, the capabilities of the target machine (e.g., the amount of memory, the number of instruction processors, the speed of instruction processors, and the speed of input/output (I/O) processors) are established using capacity management keys. Also, in some conventional methods, certain software features are enabled and limited by restricting the software set that is installed by the vendor manufacturer. Other software features are enabled using software keys.

Although each of these methods still are used to customize downloadable target machines, it is desirable for secure mechanisms to be employed to enable specific features while also preventing unauthorized cloning of downloadable machines onto additional hardware platforms. Furthermore, for customers who install additional hardware in anticipation of enabling features to which they are not entitled, it is desirable for a secure mechanism to be put in place to restrict the use of the additional hardware.

Conventionally, it is possible to use a key-based mechanism to establish and control customer feature entitlement. However, such keys should be constructed such that the licensed entitlement is locked to a specific hardware instance. The biggest drawback to using this conventional type of key-based mechanism is that the keys cannot be constructed and sent to the customer as part of the download because there would be nothing to prevent installation of the software on multiple instances. Therefore, it is desirable that there be some mechanism that provides or includes hardware identity information in the keys so that licensing can be restricted to only the target machine or machine hardware.

SUMMARY

Disclosed is a method and system for secure automated deployment of an emulated computer system. The method includes providing a download package for installation on a target computer system. The download package includes a generic emulated computer system having no unique identity, no model identity, no features, and minimal processing components. The download package also includes a customer order file based on an order from a customer of the target computer system. The customer order file includes a machine identity, at least one machine capability, and control data. The download package also includes at least one enabling key configured to enable the emulated computer system on the target machine. The enabling key is customized based on the order from the customer of the target computer system. Also, the enabling key includes identity information that restricts the use of the emulated computer system on any computer system other than the target computer system. The method also includes delivering the download package to the target computer system for installation of the emulated computer system on the target computer system. The download package prevents the unauthorized cloning of the emulated computer system onto any hardware platforms other than the target computer system. Also, the download package prevents the unauthorized use of any hardware other than the hardware of the target computer system.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Figure 1:
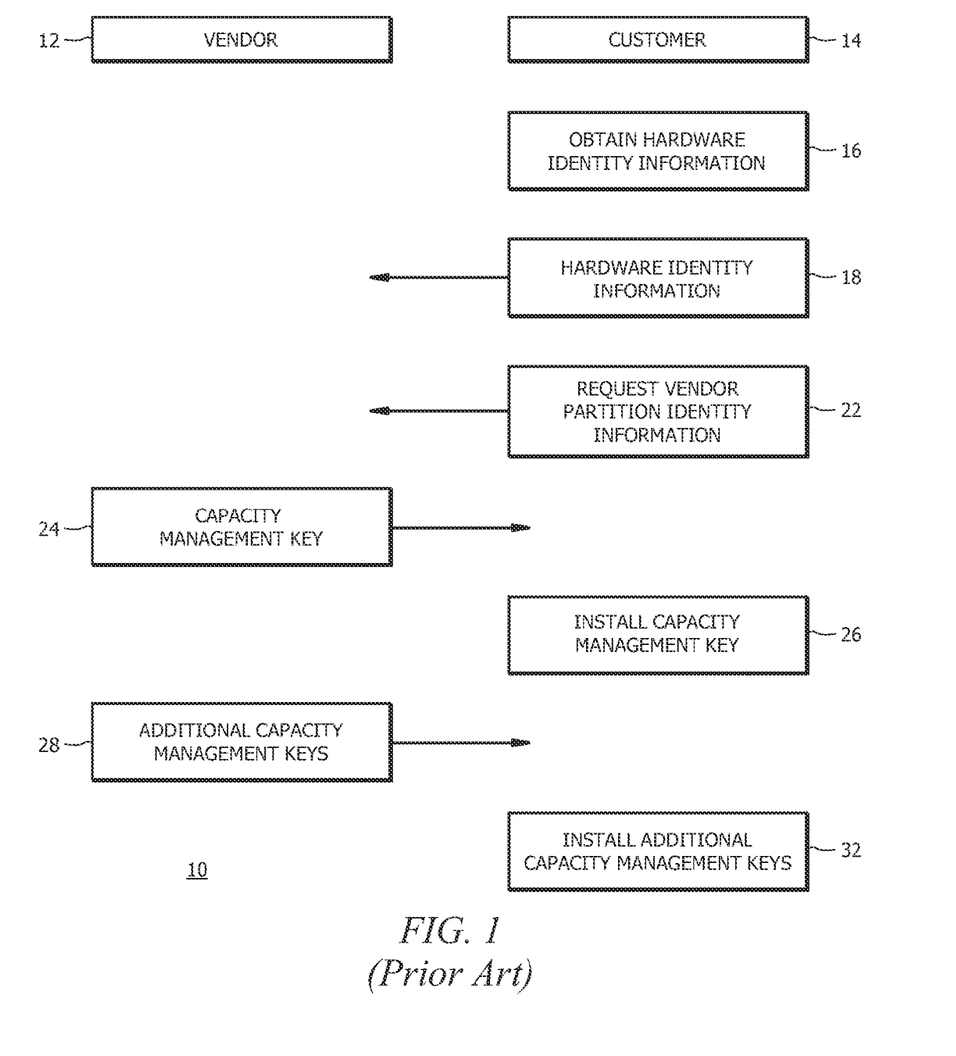
FIG. 1 is a schematic view of a method for deploying an emulated computer system from a vendor to a customer, according to a conventional arrangement.

FIG. 1 is a schematic view of a method 10 for deploying an emulated computer system from a vendor 12 to a customer 14, according to a conventional arrangement. In conventional deployment of emulated computer systems, many existing machines require manual steps for both the customer 14 and the vendor 12 (or vendor manufacturer) to establish and control the customer machine and feature entitlement. Typically, the customer 14 must start a partition on the customer's desired hardware platform. To do so, the customer 14 initially must obtain machine readable hardware identity information (e.g., motherboard serial number, service tag) from the platform hardware vendor (shown generally as a step 16). Alternatively, the machine readable hardware identity information can be read for the physical hardware itself.

The customer 14 then must provide the hardware identity information to the vendor 12 (shown generally as a step 18) and request vendor partition identity information from the vendor 12 (shown generally as a step 22). Upon receiving a request for partition identity information from the customer 14, the vendor 12 sends a capacity management key to the customer 14 (shown generally as a step 24) that links appropriate vendor partition identity information to the hardware identity of the customer 14. The customer 14 then installs the capacity management key (shown generally as a step 26) to establish the vendor partition identity information. The vendor 12 (or vendor manufacturer) also must construct additional capacity management keys using the partition identity information and customer order styles. The vendor 12 then sends the additional capacity management keys to the customer 14 (shown generally as a step 28). The customer 14 then installs the capacity management keys on the running partition (shown generally as a step 32).

Unfortunately, this conventional deployment method 10 represents undesirable delays, because manual actions are required by both the customer and the vendor to enable all of the features to which a customer is entitled. Such delay often represents an undesirable delay for the vendor in realizing revenue for an order, and an undesirable operational delay for the customer in enabling the emulated computer system.

According to an embodiment, a method for secure automated deployment of an emulated computer system from a vendor to a customer streamlines the installation of a downloadable emulated computer in which all features and customizations are automatically and securely activated the initial time the system is started by the customer. The method is applicable for various customer licenses, as well as for various partition-to-hardware platform configurations, as will be discussed in greater detail hereinbelow.

Figure 2:
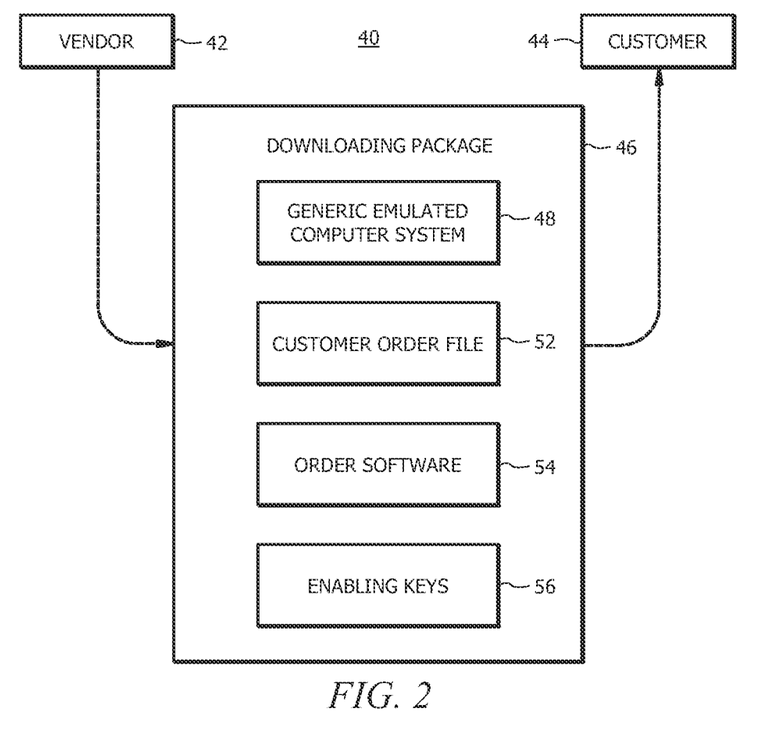
FIG. 2 is a schematic view for deploying an emulated computer system from a vendor to a customer, according to an embodiment.

FIG. 2 is a schematic view 40 for deploying an emulated computer system from a vendor to a customer, according to an embodiment. According to the method 40, a vendor 42 sends to a customer 44 a single download or install package 46. The download package 46 includes a number of components: a generic emulated computer system 48, a customer order file 52, an additional software portion 54 based on the customer order, and appropriate keys 56 to enable the software features.

According to an embodiment, the generic emulated computer system 48 has no unique identity, no model identity, no name, no software features, minimal system components (e.g., processor, memory), and severely degraded performance. This portion of the download package 46 is relatively large compared to other portions of the download package 46. If the customer starts generic the emulated computer system 48 on its own, the resulting emulated computer system is incapable of performing any meaningful work.

The customer order file 52 includes the items specified in an original customer order made by the customer 44 to the vendor 42. For example, the customer order file 52 includes the machine identity, the software identity, and machine capabilities information along with instance control data. The size of the data associated with the custom order file 52 is relatively small compared to other portions of the download package 46. For example, for some computer systems, the custom order file 52 is a 46-character encrypted string. The custom order file 52 typically is created when the machine is ordered by the customer 44.

The additional software portion 54 of the download package 46 contains software requested by the customer 44 in the original customer order made by the customer 44 to the vendor 42. The additional software portion 54 of the download package 46 varies in size depending on the software components that are ordered by the customer.

The enabling keys portion 56 of the download package 46 includes keys that are customized based on the original customer order. The keys portion 56 of the download package 46 are customized based on the machine identity that is included as part of the customer order file 52.

According to an embodiment, the download package 46 is responsible for installing the generic emulated computer system 48, the additional software 54 and the enabling keys 56 onto the target machine of the customer. The download package 46 also sets up a registry entry within the target machine, whose value is the data string found in the customer order file 52.

According to an embodiment, the download package 46 can be configured for deployment of an emulated computer system on any suitable target machine, any suitable hardware platform within the target machine, and for use with any suitable operating system running on the target machine. Such suitable operating systems include MCP (Master Control Program) operating systems, and such suitable target machines include ClearPath/MCP systems, both developed by Unisys Corporation of Blue Bell, Pa. Although the download package 46 is suitable for deployment of an emulated computer system on any suitable target machine and any suitable operating system running on the target machine, the deployment of the emulated computer system will be discussed hereinbelow in the context of an MCP environment.

Figure 3:
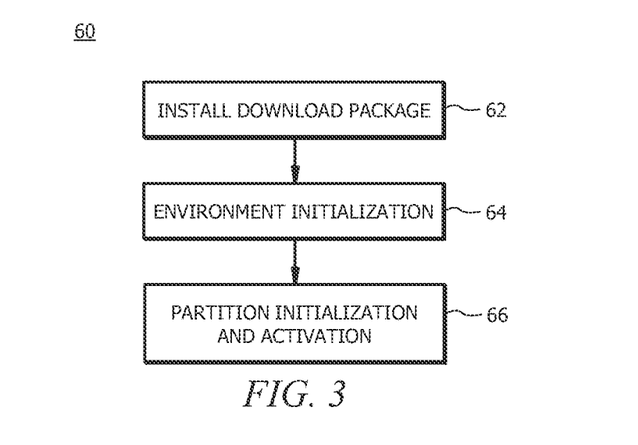
FIG. 3 is a schematic view of a method for deploying an emulated computer system on a target machine, according to an embodiment.

FIG. 3 is a schematic view of a method 60 for deploying an emulated computer system on a target computer system or target machine, according to an embodiment. Within an MCP computing environment, and upon installation of the download package 46 (see FIG. 2) on the customer target machine (shown as a step 62), an MCP environment initialization procedure 64 is initiated. As part of the initialization procedure 64, when the MCP environment is started, MCP firmware within the target machine initializes emulated machine services and data, before an MCP partition can be started. Also, MCP firmware console panels within the MCP environment indicate or verify that the target machine is a generic emulated computer system, i.e., the target machine has no unique identity, no machine name, minimal processors and minimal memory. Also, when the MCP environment is started, the MCP firmware initializes several tasks that are used in the unique identification of the partition and in determining the operating environment of the partition.

The first task includes hashing and encoding unique machine hardware identity information into a single platform serial number value. Another task includes hashing and encoding unique partition identity information into a single partition serial number value. Another task includes determining various platform vendor and virtualization environment information. The values are used to node lock a customer order to a specific partition instance. The actual process of node locking occurs later, when the MCP partition is initially started, as will be discussed hereinbelow. Also, as part of starting an MCP partition, the MCP firmware places customer order data, the platform serial number, the partition serial number, and running environment information into known MCP memory locations that are visible in a running MCP partition.

Upon completion of the MCP environment initialization procedure 64, a partition initialization and activation procedure 66 is initiated. When an MCP partition is started for the first time, a secure MCP library performs a series of actions that lead to activation of all features and capabilities to which the customer is entitled.

One of the actions of the partition initialization and activation procedure 66 involves the secure MCP library immediately initializing the MCP partition to be unlicensed. As part of this action, the maximum number of processors in the partition is reduced to one. Also, processor performance in the partition is reduced to a severely degraded state.

Another action of the partition initialization and activation procedure 66 involves the secure MCP library reading the cell serial number, the partition serial number, and running environment data from the locations where they were placed by the MCP firmware.

Another action of the partition initialization and activation procedure 66 involves the secure MCP library reading the customer order data encrypted string from the location where it was placed by the MCP firmware, and decrypting the customer order data. Information in the customer order data includes a machine unique identity value (which is unique to the customer order), a software identity value (which is used to validate software entitlements), the MCP model, the maximum number of licensed MCP partitions, the method by which the machine identity is bound to the partition, a license performance expiration date (optional), and valid platform virtualization and vendor configurations.

If the platform environment is determined to match the order environment (performed during the MCP environment initialization procedure 64), MCP machine model settings are immediately initialized for the desired characteristics and capabilities. The initialized MCP machine model settings are written to the MCP firmware, which creates corresponding registry entries. The registry entries include the MCP model, name strings (machine name, product line name, order name), the maximum number of MCP processors, the maximum MCP memory, the maximum processor speed capability, and the maximum input/output (I/O) rate capability.

If the order is determined to be valid (from the MCP environment initialization procedure 64), an encrypted activation code that combines order data and platform information is generated. This encrypted activation code is written to MCP firmware, which creates a corresponding registry entry. The activation code typically includes the following information: the machine unique identity value, the software identity value, the MCP model, the maximum number of licensed MCP partitions, the method by which the machine identity is bound to the partition(s), the platform serial number value, and the partition serial number value.

After the encrypted activation code is generated and written to MCP firmware, and a corresponding registry entry is created, the MCP firmware connects to a predetermined address and enters the activation code into an external MCP license utility. The external license utility processes the activation code to determine if the customer is entitled to license this MCP partition. Processing of the activation code includes tracking a customer activation key request, tracking the order, and tracking the partition in a structured query language (SQL) database. If the customer is entitled to this MCP partition, an activation key is created and returned to the MCP firmware.

More specifically, the steps involved in processing the activation code include creating a customer activation key request entry, and decrypting the activation code. If the activation code is already active, an activation key is returned. If this is the first time this order is encountered, order tracking information is created. If the order licenses multiple MCP partitions, or specifies a single platform only, and there is at least one license already active for this order, then verification that the underlying platform used for this order has not changed occurs. Also, a check is made that a partition license is available (e.g., the number of active licensed partitions is less than maximum number of licensed partitions for this order). If this is the first time this partition is encountered, partition tracking information is created. If there are no errors in the activation code processing, the partition tracking information is updated and an activation key is returned.

Once the activation code processing is completed, the MCP firmware creates a registry entry for the activation key. The MCP firmware writes the activation key to a known location in MCP memory so that the activation key can be read by the secure MCP library.

The secure MCP library monitors MCP memory for an activation key. When an activation key appears in MCP memory, the activation key is decrypted and verified that it matches the customer order and the partition identity. The activation key includes a machine unique identity value, which must match the order unique machine identity. The activation key also includes an MCP model, which must match the order MCP model. The activation key also includes a licensing partition serial number, which must match the MCP partition serial number.

If the activation key is valid, a number of partition activation actions are initiated. For example, the unique machine identity value is set to the value specified in the activation key. Also, the secure MCP library creates, installs, and activates a processor performance key using the licensed processor performance configuration and the optional expiration date specified in the customer order data. Also, the level of MCP processor performance is increased to the licensed level of performance. Also, for a multi-processor MCP license, the secure MCP library enables additional processors to match the licensed number of processors.

In providing a mechanism that employs the use of registry entries to communicate order data, activation codes, and activation keys, the vendor must be cognizant of the possibility that the customer might be able to replace those registry entries with valid entries from another machine, or to try brute force attacks in an attempt to activate their own licenses.

According to an embodiment, the vendor can take steps to be protected from unauthorized machine activation by user tampering with machine registry entries. For example, the data in the custom order file 52 can be encrypted using a secure encryption algorithm. Also, the encryption and decryption process typically is not performed in the user's normal Windows application environment, where a debugger application could be used to determine the algorithm. Instead, encryption and decryption typically is performed external to the user's Windows environment, or is performed in the running MCP environment in which the use of a debugger application to determine underlying algorithms is relatively difficult.

According to an embodiment, as discussed hereinabove, the creation of the custom order file 52 is performed by the vendor and is included as part of the download package 46. Also, data from the custom order file 52 is used to create a custom order data registry entry. The encrypted data is not interpreted, but rather is copied into the appropriate registry entry. Also, although the MCP firmware obtains the custom order data from a registry entry and makes the data visible to MCP software, the data continues to be encrypted.

Also, MCP software reads the custom order data that is initialized by MCP firmware, decrypts the data, and validates the machine model and the underlying Windows environment. If these actions are successful, then appropriate machine branding and licensing changes are finalized by the MCP software. This includes automatic creation, installation, and activation of a performance license key that is tied to the specific partition. The installation of this key on any other partition is rejected because the partition serial number does not match the value embedded in the key. Also, the performance license key can include an expiration date that can be specified in the custom order file data.

According to an embodiment, if the user modifies machine settings registry entries in an attempt to upgrade performance, the MCP software immediately restores all machine settings when the machine is started. For settings that cannot be modified until the machine is subsequently restarted, the MCP software disables the use of the additional resource. For example, if the user changes the registry entry that specifies the size of MCP memory to a larger value, the MCP firmware allocates the larger memory size, but the MCP software reduces the memory ceiling to only the level that is supported for the emulated machine.

For an encrypted custom order, unauthorized attempts by the user to enable additional resources by changing the custom order data is effectively prevented mathematically. For example, the chances of creating a valid custom order data string by changing the string is about 6 parts in 10,000,000,000,000,000. Thus, brute force attacks are effectively disabled by the magnitude of this value.

Figure 4:
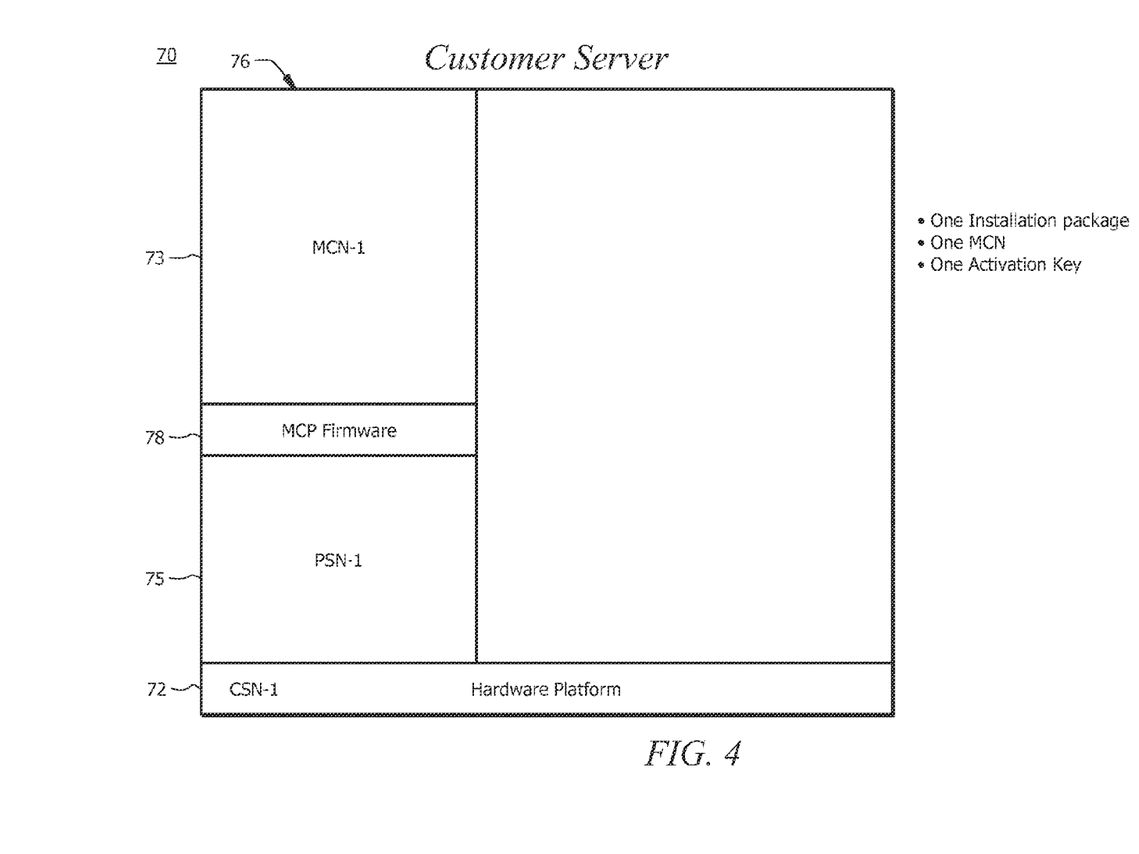
FIG. 4 is a schematic view of a 1-partition on a single hardware platform configuration, using a single installation package, according to an embodiment.

According to an embodiment, an emulated computer system can be deployed in a number of suitable partition-to-hardware platform configurations. For example, FIG. 4 is a schematic view 70 of a 1-partition on a single hardware platform 72 configuration, using a single installation package, according to an embodiment. The single hardware platform 72, which can be any suitable hardware platform, e.g., a non-virtualized environment, has assigned thereto a cell serial number (CSN-1).

The configuration shown in FIG. 4 includes a single partition 76 having its own firmware 78 (e.g., MCP firmware). The single partition 76 also has a single manufacturing control number (MCN-1) 73 and a single partition serial number (PSN-1) 75. The use of one MCN implies the use of a single customer server. According to an embodiment, the configuration shown in FIG. 4 is deployed using one installation package, one MCN and one activation key.

Figure 5:
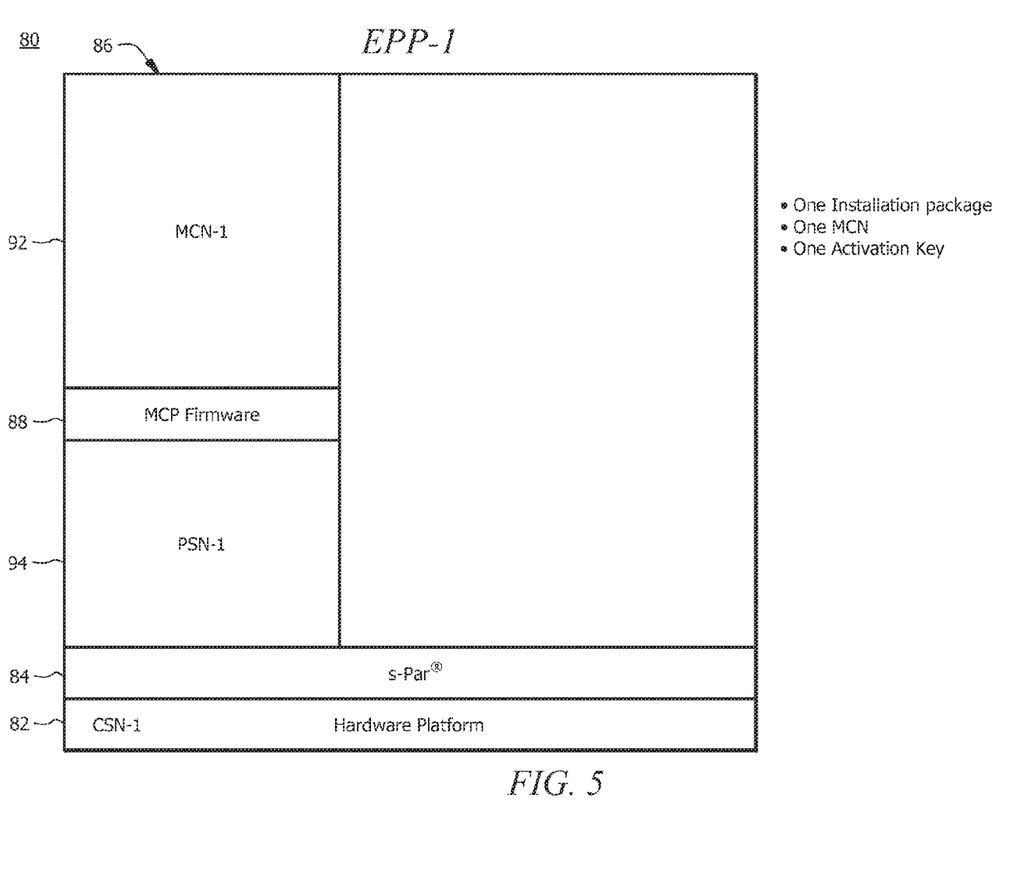
FIG. 5 is a schematic view of an alternative 1-partition on a single hardware platform configuration, using a single installation package, according to an embodiment.

The configuration shown in FIG. 5 is a schematic view 80 of a 1-partition on a single hardware platform 82 configuration, using a single installation package, according to an embodiment. The single hardware platform 82, which can be any suitable hardware platform, has assigned thereto a cell serial number (CSN-1). The hardware platform 82 also can include or have embedded thereon or therein a secure partition tool and architecture 84 (virtualization technology for ClearPath systems referred to as secure partitioning, or s-Par®), developed by Unisys Corporation of Blue Bell, Pa.

The configuration shown in FIG. 5 includes a single partition 86 having its own firmware 88 (e.g., MCP firmware). The single partition 86 also has a single manufacturing control number (MCN-1) 92 and a single partition serial number (PSN-1) 94. The use of one MCN implies the use of a single Enterprise Platform Partition (EPP), e.g., EPP-1. According to an embodiment, the configuration shown in FIG. 5 is deployed using one installation package, one MCN and one activation key.

Figure 6:
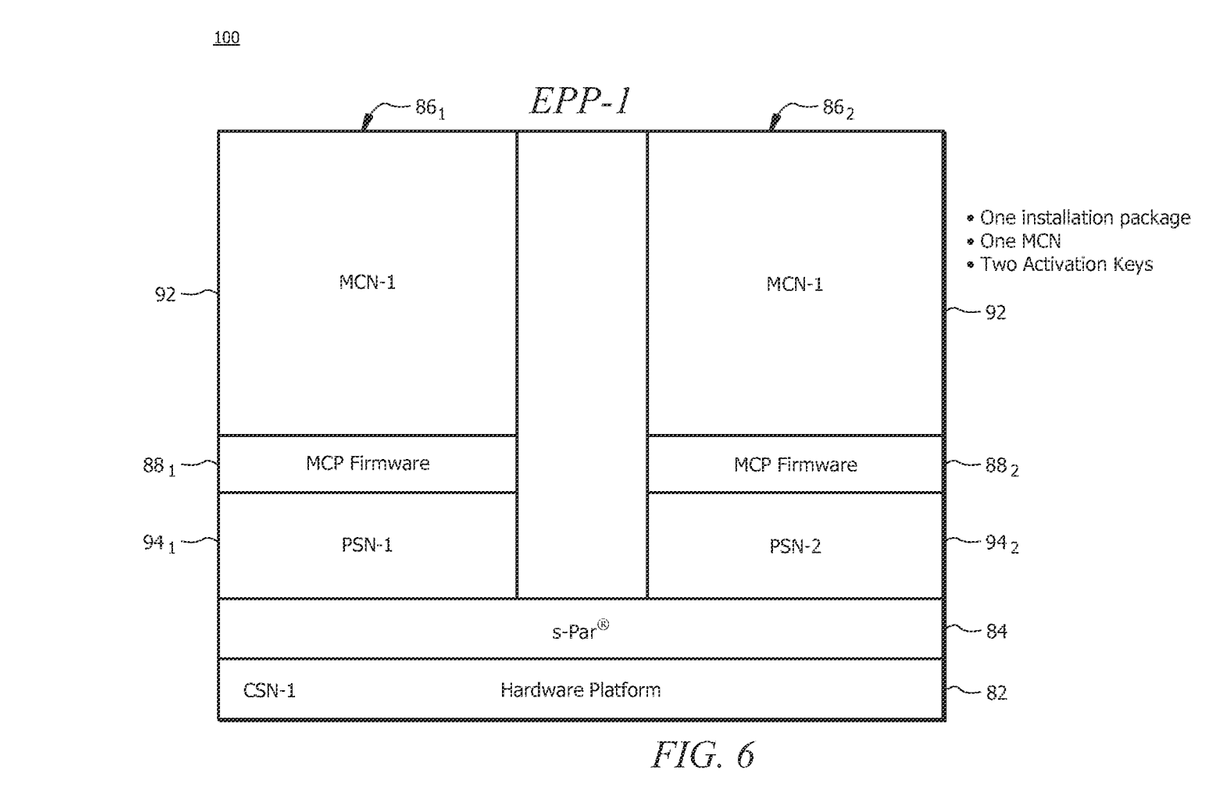
FIG. 6 is a schematic view of a 2-partition on a single hardware platform configuration, using a single installation package, according to an embodiment.

FIG. 6 is a schematic view 100 of a 2-partition on a single hardware platform 82 configuration, using a single installation package, according to an embodiment. The single hardware platform 82, which can be any suitable hardware platform, has assigned thereto a cell serial number (CSN-1). The hardware platform 82 also can include or have embedded thereon or therein a secure partition tool and architecture (s-Par®) 84.

The configuration shown in FIG. 6 includes two partitions $86_1$ and $86_2$, with each partition having its own firmware $88_1$ and $88_2$ (e.g., MCP firmware), respectively. However, each partition $86_1$ and $86_2$ has the same manufacturing control number (MCN-1) 92. Each partition $86_1$ and $86_2$ has its own partition serial number (PSN), e.g., PSN-1 $94_1$ for partition $86_1$ and PSN-2 $94_2$ for partition $86_2$. Also, the use of one MCN implies the use of a single EPP (EPP-1). According to an embodiment, the configuration shown in FIG. 6 is deployed using one installation package, one MCN and two activation keys. According to an embodiment, the activation keys are used on the same EPP.

Figure 7:
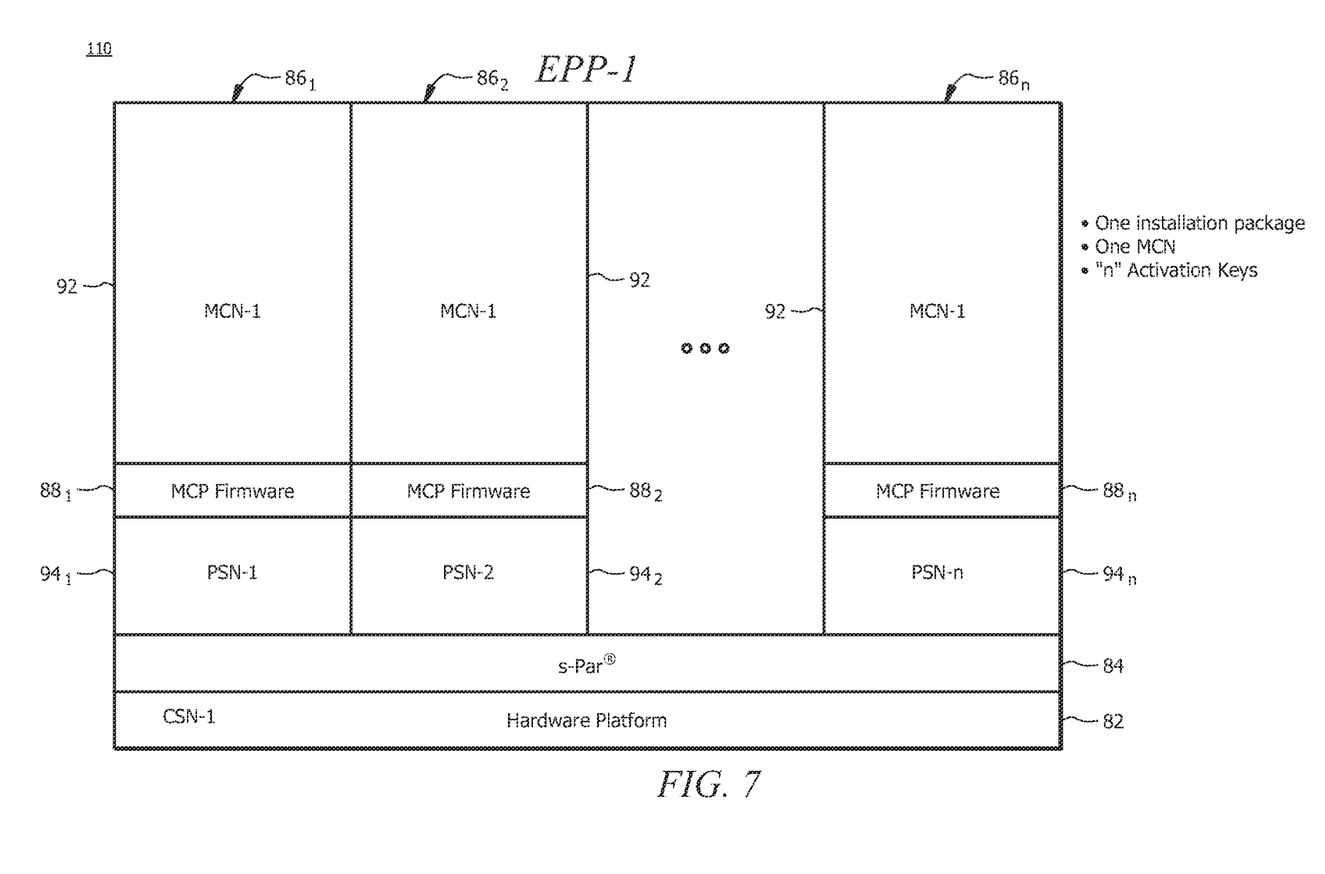
FIG. 7 is a schematic view of a multi-partition on a single hardware platform configuration, using a single installation package, according to an embodiment.

FIG. 7 is a schematic view 110 of a multi-partition on a single hardware platform 82 configuration, using a single installation package, according to an embodiment. The single hardware platform 82, which can be any suitable hardware platform, has assigned thereto a cell serial number (CSN-1). The hardware platform 82 also can include or have embedded thereon or therein a secure partition tool and architecture (s-Par®) 84.

The configuration shown in FIG. 7 includes "n" partitions $86_1$, $86_2$, ... $86_n$, with each partition having its own firmware $88_1$, $88_2$, ... $88_n$ (e.g., MCP firmware), respectively. However, each partition $86_1$, $86_2$, ... $86_n$ has the same manufacturing control number (MCN-1) 92. Each partition $86_1$, $86_2$, ... $86_n$ also has its own partition serial number (PSN), e.g., PSN-1 $94_1$, for partition $86_1$, PSN-2 $94_2$ for partition $86_2$, and PSN-n $94_n$ for partition $86_n$. Also, the use of one MCN implies the use of a single EPP (EPP-1). According to an embodiment, the configuration shown in FIG. 7 is deployed using one installation package, one MCN and "n" activation keys. According to an embodiment, the activation keys are used on the same EPP.

Figure 8:
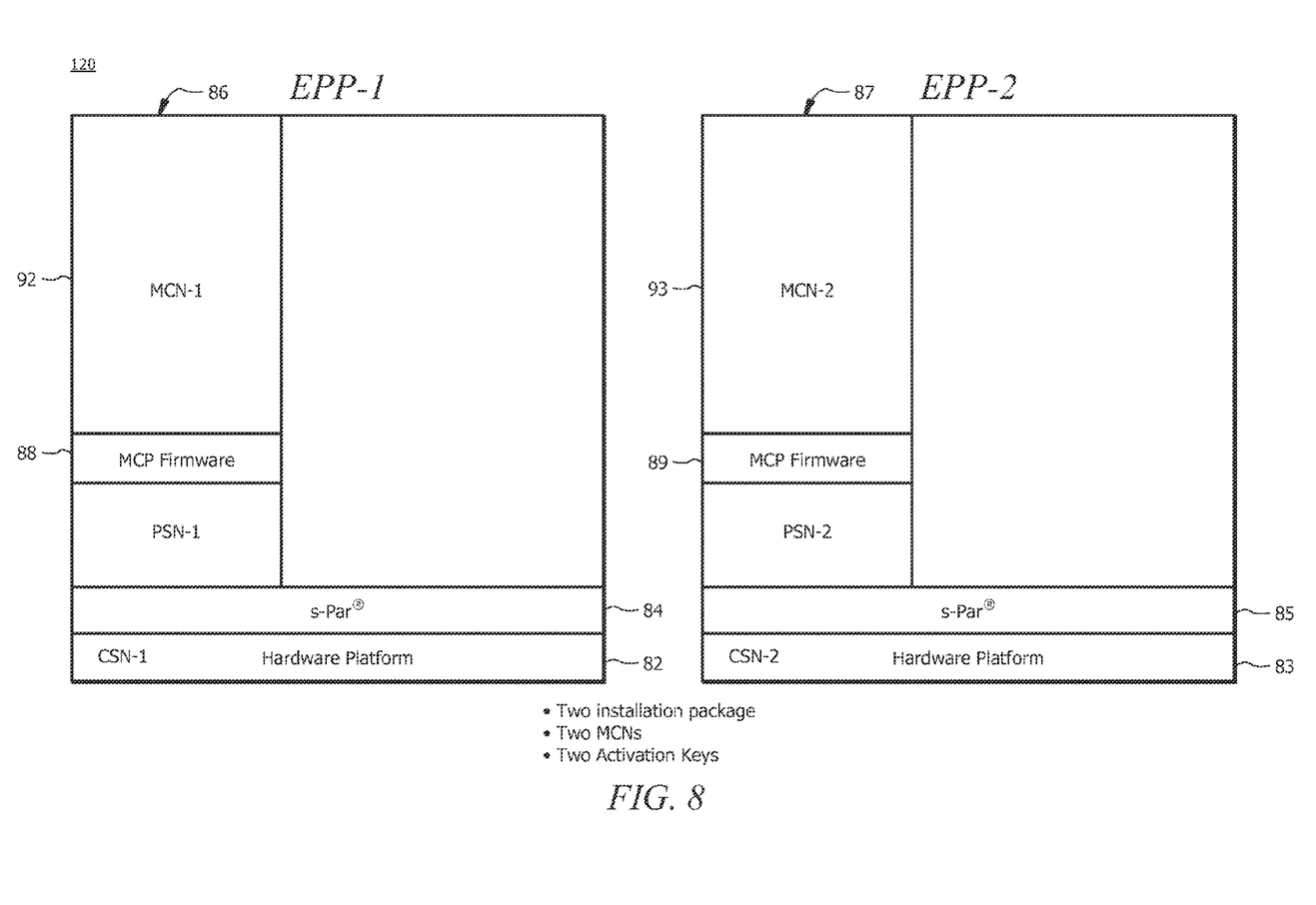
FIG. 8 is a schematic view of a 1-partition on each of two hardware platforms configuration, using two installation packages, according to an embodiment.

FIG. 8 is a schematic view 120 of a 1-partition on each of two hardware platforms 82 and 83 configuration, using two installation packages, according to an embodiment. Each hardware platform, which can be any suitable hardware platform, has assigned thereto a cell serial number (CSN-1). Thus, the hardware platform 82 has assigned thereto a cell serial number CSN-1 and the hardware platform 83 has assigned thereto a cell serial number CSN-2. Each hardware platform also can include or have embedded thereon or therein its own secure partition tool and architecture (s-Par®). Thus, the hardware platform 82 includes or has embedded thereon or therein a secure partition tool and architecture (s-Pare) 84, and the hardware platform 83 includes or has embedded thereon or therein a secure partition tool and architecture (s-Par®) 85.

The configuration shown in FIG. 8 includes a single partition on each hardware platform. Thus, the hardware platform 82 includes a single partition 86, and the hardware platform 83 includes a single partition 87. Each partition has its own firmware (e.g., MCP firmware), thus, the partition 86 includes its own firmware 88 and the partition 87 includes its own firmware 89.

Also, each partition has its own manufacturing control number. Thus, the partition 86 has a manufacturing control number (MCN-1) 92, and the partition 87 has a manufacturing control number (MCN-2) 93. The use of two manufacturing control numbers (MCNs) implies the use of two corresponding EPPs, i.e., EPP-1 for MCN-1 and EPP-2 for MCN-2. According to an embodiment, the configuration shown in FIG. 8 is deployed using two installation packages, two MCNs and two activation keys. Alternatively, the configuration shown in FIG. 8 can be using two different non-virtualized, i.e., two non-EPP servers.

Figure 9:
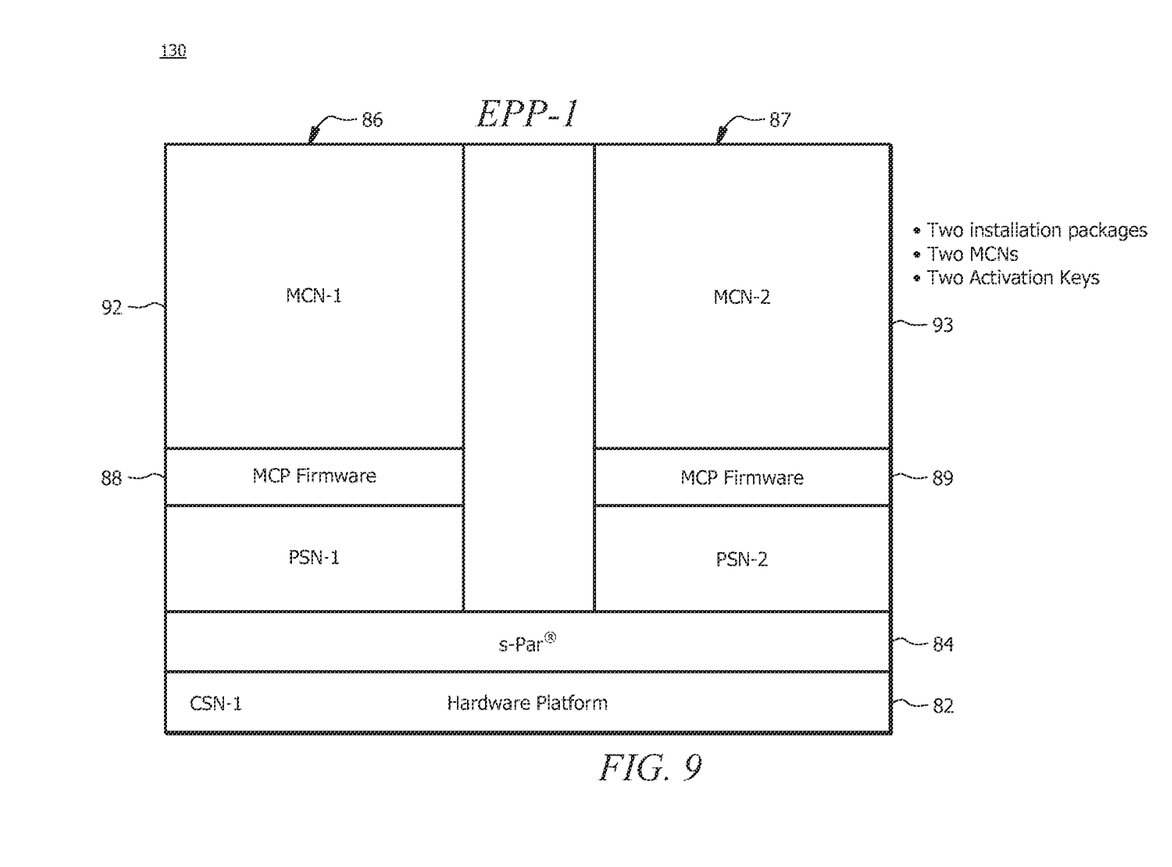
FIG. 9 is a schematic view of two partitions on a single hardware platform configuration, using two installation packages, according to an embodiment.

FIG. 9 is a schematic view 130 of two partitions on a single hardware platform 82 configuration, using two installation packages, according to an embodiment. The single hardware platform 82, which can be any suitable hardware platform, has assigned thereto a cell serial number (CSN-1). The hardware platform 82 also can include or have embedded thereon or therein a secure partition tool and architecture (s-Par®) 84.

The configuration shown in FIG. 9 includes two (or more) partitions on the single hardware platform 82. For example, the hardware platform 82 includes a first partition 86 and a second partition 87. Each partition has its own firmware (e.g., MCP firmware), thus, the partition 86 includes its own firmware 88, and the partition 87 includes its own firmware 89.

Also, each partition has its own manufacturing control number. Thus, the partition 86 has a manufacturing control number (MCN-1) 92, and the partition 87 has a manufacturing control number (MCN-2) 93. Although two manufacturing control numbers (MCNs) are used, the configuration in shown FIG. 9 makes use of a single EPP (EPP-1). According to an embodiment, the configuration shown in FIG. 9 is deployed using two installation packages, two MCNs and two activation keys.

Figure 10:
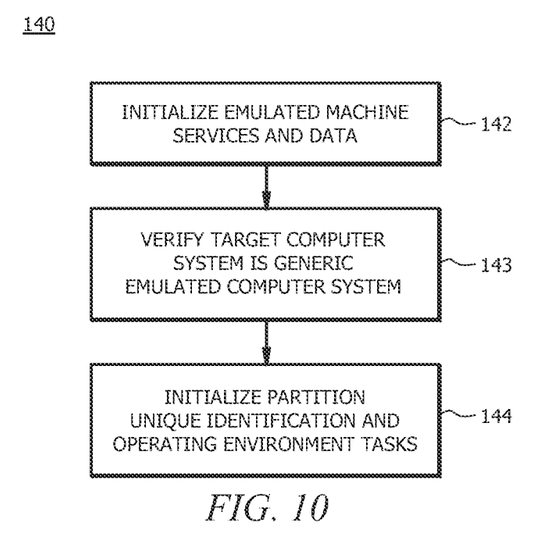
FIG. 10 is a flow diagram of a method for the environment initialization of FIG. 2, according to an embodiment.

FIG. 10 is a flow diagram of a method 140 for the environment initialization 64 of FIG. 2, according to an embodiment. The method 140 includes a step 142 of initializing emulated machine services and data. As discussed hereinabove, when the MCP environment is started, MCP firmware within the target machine initializes emulated machine services and data, before an MCP partition can be started.

The method 140 also includes a step 143 of verifying that the target machine is a generic emulated computer system. As discussed hereinabove, MCP firmware console panels within the MCP environment indicate or verify that the target machine is a generic emulated computer system. That is, MCP firmware console panels within the MCP environment indicate or verify that the target machine has no unique identity, no machine name, minimal processors and minimal memory.

The method 140 also includes a step 144 of initializing partition unique identification and operating environment tasks. As discussed hereinabove, when the MCP environment is started, the MCP firmware initializes several tasks that are used in the unique identification of the partition and in determining the operating environment of the partition. These tasks include hashing and encoding unique machine hardware identity information into a single platform serial number value, hashing and encoding unique partition identity information into a single partition serial number value, and determining various platform vendor and virtualization environment information.

Figure 11:
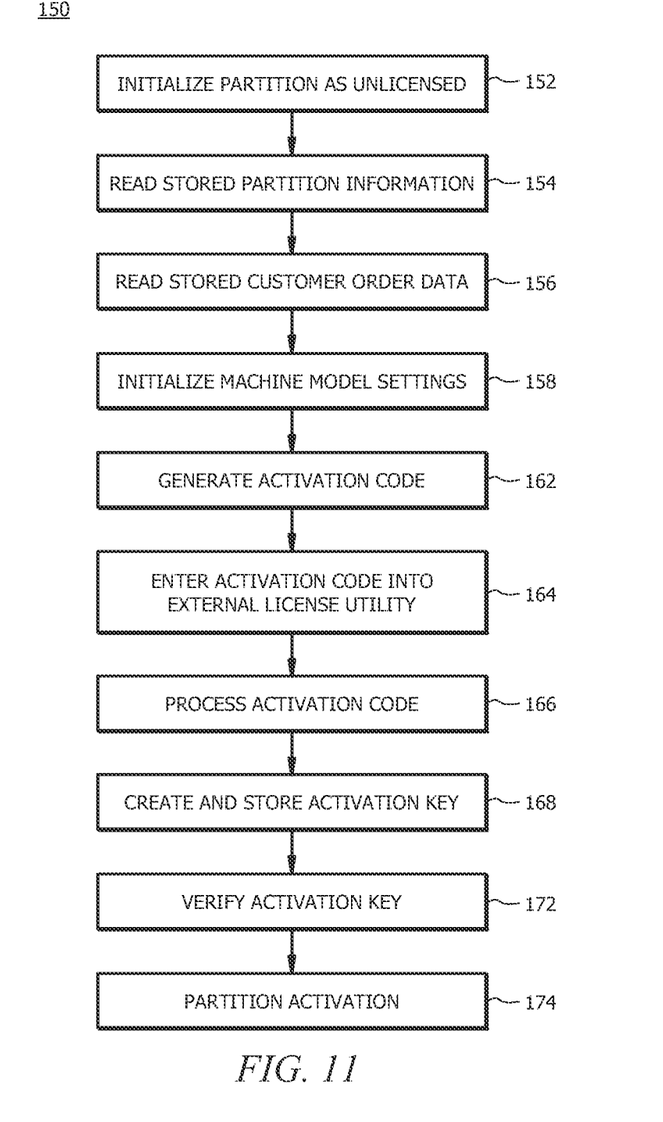
FIG. 11 is a flow diagram of a method for the partition initialization and activation of FIG. 2, according to an embodiment.

FIG. 11 is a flow diagram of a method 150 for the partition initialization and activation 66 of FIG. 2, according to an embodiment. As discussed hereinabove, when an MCP partition is started for the first time, a secure MCP library performs a series of actions that lead to activation of all features and capabilities to which the customer is entitled.

The method 150 includes a step 152 of initializing the partition as unlicensed. This step involves the secure MCP library immediately initializing the MCP partition to be unlicensed. As part of this step 152, the maximum number of processors in the partition is reduced to one. Also, as part of this step 152, processor performance in the partition is reduced to a severely degraded state.

The method 150 also includes a step 154 of reading stored partition information. As discussed hereinabove, the secure MCP library reads the cell serial number, the partition serial number, and running environment data from the locations where they were placed previously by the MCP firmware.

The method 150 also includes a step 156 of reading stored customer order data. As discussed hereinabove, the secure MCP library reads encrypted customer order data from the location where it was placed by the MCP firmware, and decrypts the customer order data. Information in the customer order data includes a machine unique identity value (which is unique to the customer order), a software identity value (which is used to validate software entitlements), the MCP model, the maximum number of licensed MCP partitions, the method by which the machine identity is bound to the partition, a license performance expiration date (optional), and valid platform virtualization and vendor configurations.

The method 150 also includes a step 158 of initializing machine model settings. As discussed hereinabove, if the platform environment is determined to match the order environment, MCP machine model settings are immediately initialized for the desired characteristics and capabilities. The initialized MCP machine model settings are written to the MCP firmware, which creates corresponding registry entries. The registry entries include the MCP model, name strings (machine name, product line name, order name), the maximum number of MCP processors, the maximum MCP memory, the maximum processor speed capability, and the maximum input/output (I/O) rate capability.

The method 150 also includes a step 162 of generating an activation code. As discussed hereinabove, if the order is determined to be valid, an encrypted activation code that combines order data and platform information is generated. This encrypted activation code is written to MCP firmware, which creates a corresponding registry entry. The activation code typically includes the following information: the machine unique identity value, the software identity value, the MCP model, the maximum number of licensed MCP partitions, the method by which the machine identity is bound to the partition(s), the platform serial number value, and the partition serial number value.

The method 150 also includes a step 164 of entering the activation code into an external license utility. As discussed hereinabove, after the encrypted activation code is generated and written to MCP firmware, and a corresponding registry entry is created, the MCP firmware connects to a predetermined address and enters the activation code into an external license utility. Alternatively, the activation code can be entered into the external license utility in response to a request/confirmation made by the customer. The external license utility processes the activation code to determine if the customer is entitled to license this MCP partition. Processing of the activation code includes tracking a customer activation key request, tracking the order, and tracking the partition in a structured query language (SQL) database. If the customer is entitled to this MCP partition, an activation key is created and returned to the MCP firmware.

The method 150 also includes a step 166 of processing the activation code. As discussed hereinabove, processing the activation code includes creating a customer activation key request entry and decrypting the activation code. If the activation code is already active, an activation key is returned. If this is the first time this order is encountered, order tracking information is created. If the order licenses multiple MCP partitions, or specifies a single platform only, and there is at least one license already active for this order, then verification that the underlying platform used for this order has not changed occurs. Also, a check is made that a partition license is available (e.g., the number of active licensed partitions is less than maximum number of licensed partitions for this order). If this is the first time this partition is encountered, partition tracking information is created. If there are no errors in the activation code processing, the partition tracking information is updated and an activation key is returned.

The method 150 also includes a step 168 of creating and storing the activation key. As discussed hereinabove, once the activation code processing is completed, and the MCP license utility returns an activation key to MCP firmware, the MCP firmware creates a registry entry for the activation key and writes the activation key to a known location in MCP memory so that the activation key can be read by the secure MCP library.

The method 150 also includes a step 172 of verifying the activation key. As discussed hereinabove, the secure MCP library monitors MCP memory for an activation key. When an activation key appears in MCP memory, the activation key is decrypted and verified that it matches the customer order and the partition identity. The activation key includes a machine unique identity value, which must match the order unique machine identity. The activation key also includes an MCP model, which must match the order MCP model. The activation key also includes a licensing partition serial number, which must match the MCP partition serial number.

The method 150 also includes a step 174 of activating the partition. As discussed hereinabove, if the activation key is valid, a number of partition activation actions are initiated. For example, the unique machine identity value is set to the value specified in the activation key. Also, the secure MCP library creates, installs, and activates a processor performance key using the licensed processor performance configuration and the optional expiration date specified in the customer order data. Also, the level of MCP processor performance is increased to the licensed level of performance. Also, for a multi-processor MCP license, the secure MCP library enables additional processors to match the licensed number of processors.

It will be apparent to those skilled in the art that many changes and substitutions can be made to the embodiments described herein without departing from the spirit and scope of the disclosure as defined by the appended claims and their full scope of equivalents.

The invention claimed is:

1. A method for deploying an emulated computer system, the method comprising:
providing, by a processor, a download package for installation on a target machine,
wherein the download package includes:
a generic emulated computer system having no unique identity, no model identity, no features, and minimal processing components,
a customer order file based on an order from a customer of the target machine, wherein the customer order file includes a machine identity, at least one machine capability, and control data, and
at least one enabling key configured to enable the generic emulated computer system on the target machine to implement a specific emulated computer system, wherein the at least one enabling key is customized based on the order from the customer of the target machine, and wherein the at least one enabling key includes identity information that restricts the use of the specific emulated computer system on any computer systems other than the target machine; and
delivering, by the processor, the download package to the target machine for installation of the specific emulated computer system on the target machine,
wherein the at least one enabling key prevents the unauthorized cloning of the specific emulated computer system onto any hardware platforms other than the target machine, and
wherein the at least one enabling key prevents the unauthorized use of any hardware other than the hardware of the target machine.

2. The method as recited in claim 1, wherein the download package, upon installation, initiates an environment initialization process for the target machine.

3. The method as recited in claim 1, wherein the download package, upon a partition being started within the target machine, initiates a partition initialization and activation process for the target machine, whereby the specific emulated computer system is activated on the target machine.

4. The method as recited in claim 1, wherein the customer order file includes software specified by the customer of the target machine, and wherein the download package includes a software portion having the software specified by the customer of the target machine.

5. The method as recited in claim 1, wherein the target machine is a Clearpath/MCP computer system running a Master Control Program (MCP) operating system.

6. A method for deploying an emulated computer system, the method comprising:
receiving, by a processor, a download package for installation by a target machine,
wherein the download package includes:
a generic emulated computer system having no unique identity, no model identity, no features, and minimal processing components,
a customer order file based on an order from a customer of the target machine, wherein the customer order file includes a machine identity, at least one machine capability, and control data, and
at least one enabling key configured to enable the generic emulated computer system on the target machine to implement a specific emulated computer system, wherein the at least one enabling key is customized based on the order from the customer of the target machine, and wherein the at least one enabling key includes identity information that restricts the use of the specific emulated computer system on any computer systems other than the target machine; and
installing, by the processor, the download package on the target machine to deploy the specific emulated computer system on the target machine,
wherein the at least one enabling key prevents the unauthorized cloning of the specific emulated computer system onto any hardware platforms other than the target machine, and
wherein the at least one enabling key prevents the unauthorized use of any hardware other than the hardware of the target machine.

7. The method as recited in claim 6, wherein the download package, upon installation, initiates an environment initialization process for the target machine.

8. The method as recited in claim 7, wherein the environment initialization process includes initializing emulated machine services and data for the target machine.

9. The method as recited in claim 7, wherein the environment initialization process includes verifying that the target machine is a generic emulated computer system.

10. The method as recited in claim 7, wherein the environment initialization process includes initializing partition unique information and operating environment tasks for the target machine that are used to node lock the customer order file to a specific partition instance.

11. The method as recited in claim 6, wherein the download package, upon a partition being started within the target machine, initiates a partition initialization and activation process for the target machine.

12. The method as recited in claim 11, wherein the partition initialization and activation process includes initializing the partition as unlicensed, and wherein the maximum number of processors in the partition is reduced to one partition.

13. The method as recited in claim 11, wherein the partition initialization and activation process includes reading partition information stored as part of an environment initialization process performed prior to the partition initialization and activation process.

14. The method as recited in claim 11, wherein the partition initialization and activation process includes reading partition unique data from the customer order file stored as part of an environment initialization process performed prior to the partition initialization and activation process.

15. The method as recited in claim 11, wherein the partition initialization and activation process includes initializing machine model settings for the target machine based on data from the customer order file.

16. The method as recited in claim 11, wherein the partition initialization and activation process includes generating an encrypted activation code based on data from the customer order file and hardware identity information.

17. The method as recited in claim 16, wherein the partition initialization and activation process includes entering the encrypted activation code into an external license utility to determine if the target machine is allowed to access the partition.

18. The method as recited in claim 16, wherein the partition initialization and activation process includes processing the encrypted activation code by creating a customer activation key request entry, decrypting the encrypted activation code, and generating a customer activation key based on the decrypted activation code.

19. The method as recited in claim 18, wherein the partition initialization and activation process includes creating and storing the customer activation key.

20. The method as recited in claim 18, wherein the partition initialization and activation process includes verifying that the customer activation key matches at least a portion of the data from the customer order file and the identity of the partition.

21. The method as recited in claim 18, wherein the partition initialization and activation process includes activating the partition based on the information in the activation key.

* * * * *